United States Patent [19]

Willinger et al.

[11] Patent Number: 4,842,727

[45] Date of Patent: Jun. 27, 1989

[54] AQUARIUM FILTER

[75] Inventors: Allan H. Willinger, Oakland; Klaus Woltmann, Demarest, both of N.J.

[73] Assignee: Willinger Brothers, Inc., Oakland, N.J.

[21] Appl. No.: 139,016

[22] Filed: Dec. 29, 1987

[51] Int. Cl.[4] .............................................. A01K 63/04
[52] U.S. Cl. .................................. 210/169; 210/416.2; 119/5; 137/563; 417/440; 415/145
[58] Field of Search ............................ 119/5; 137/563; 210/169, 416.2; 251/318, 319, 205, 340, 343, 347; 415/145; 417/370, 440

[56] References Cited

U.S. PATENT DOCUMENTS

| | | | |
|---|---|---|---|
| 1,270,872 | 4/1918 | Roberts et al. | 417/440 |
| 1,296,875 | 3/1919 | Swenson | 419/440 |
| 1,401,097 | 12/1921 | Nickolaus | 251/343 |
| 4,039,453 | 8/1977 | Horvath | 210/169 |
| 4,512,885 | 4/1985 | Willinger | 210/136 |
| 4,602,996 | 7/1986 | Willinger | 210/136 |

FOREIGN PATENT DOCUMENTS

| | | | |
|---|---|---|---|
| 3136383 | 3/1983 | Fed. Rep. of Germany | 210/169 |
| 821924 | 5/1937 | France | 417/440 |

*Primary Examiner*—Richard V. Fisher
*Assistant Examiner*—Christopher Upton
*Attorney, Agent, or Firm*—Helfgott & Karas

[57] ABSTRACT

An aquarium filter having a housing unit for mounting on the wall of the aquarium tank with an intake chamber for receiving contaminated water and a filtering chamber for filtering the contaminated water and passing it back into the aquarium. A removable intake tube transfers the water from an inlet end to an outlet end where it can flow from the aquarium tank to the intake chamber. A slidable control valve selectively exposes bypass ports on the outlet end to regulate the flow rate of the aquarium water from a maximum down to shutoff, and all values therebetween.

20 Claims, 3 Drawing Sheets

AQUARIUM FILTER

BACKGROUND OF THE INVENTION

This invention relates to aquarium filters, and more particularly to an external aquarium filter having a mechanism for controlling the flow rate of aquarium water from an aquarium tank into the filter, between a maximum flow rate and a substantially shut-off flow rate.

Aquarium filters are generally utilized for aeration and filtration of aquarium water and at the same time provide a circulation to such water. One type of aquarium filter commonly in use is an externally mounted filter having a housing which is mounted on the wall of an aquarium tank.

One such aquarium filter assembly is described in U.S. Pat. No. 4,512,885, and assigned to the assignee of the present invention. Such aquarium filter assembly includes a housing unit which is adapted to be mounted externally on a wall of an aquarium tank. The housing unit contains an intake chamber which receives contaminated water from the aquarium tank, and a filter chamber for filtering the contaminated water from the intake chamber. The two chambers are in fluid flow communication with each other. A removable unitary intake assembly is supportedly positioned in the housing and includes an inlet flow tube for supplying the contaminated water from the aquarium tank to the intake chamber, and a pump impeller unit which is magnetically coupled to a motor unit. The motor unit is externally supported from the housing unit and includes stator laminations having an interior bore. The pump impeller unit is mounted on a rotor and extends from the inlet flow tube into the bore for magnetic coupling to the stator laminations.

In operation, the filter is initially primed by placing water in the intake chamber sufficient to cover the impeller unit. The filter assembly is mounted on the aquarium tank wall with the inlet flow tube extending into the aquarium tank water. The motor is energized to rotate the impeller causing a reduced pressure at an outlet end of the unitary intake assembly. The reduced pressure causes the aquarium tank water to flow through the intake assembly into the intake chamber of the filter through a centrifugal pumping action. As the water accumulates in the intake chamber of the filter assembly, it flows into the filter chamber where the contaminated water is filtered and discharged back into the aquarium tank.

In using an aquarium filter assembly of the aforementioned kind, it is desirable to control the flow rate of water from the aquarium tank into the filter. Normally, the flow is constant and dependent upon the strength of the impeller unit. However, such constant flow rate may be too much for specific activities of the aquarium tank. For example, when adding food to the tank, it is desirable to reduce the flow rate since a strong flow would draw in the food into the filter and prevent its consumption by the fish. At the same time the food in the filter would tend to overload the filter unit itself. By reducing the flow rate to a minimum, the food will have an opportunity to be dissipated in the tank and consumed by the fish.

Likewise, when adding baby fish, a continuous heavy flow rate of water from the tank may cause complications to the tank and thus a reduced flow rate would be desirable. A control valve is therefore needed for the aforementioned aquarium filter assembly. Such control valve could be included within the intake assembly unit as is described in the aforementioned patent. An additional type of control valve is described in U.S. Pat. No. 4,602,996 also assigned to the assignee of the present invention. In this latter control valve, an adjustable valve member is disposed in one of the legs of the intake assembly unit for controlling the rate of flow and is manually operable externally of the filter unit. The valve member includes an elongated tube having one closed portion and one open portion and is rotatable within one of the legs of the intake assembly unit where it can substantially reduce the flow of water from the aquarium tank.

While such prior art control valves are useful in the intake assembly, the construction of such valves adds considerable cost to the manufacture of the intake unit assembly and requires substantial modification of molds. Additionally, during use of such valves, the valve can reduce the flow rate but normally does not shut off the flow rate. Normally, shutting off of the flow rate will stop all flow into the intake assembly. Since the motor unit continues operating it heats whatever water is in the intake chamber. Such continued heating of the water may evaporate the water in the intake chamber and without any flow of water to cool the motor the heat may cause damage to the surrounding parts. Additionally, complete evaporation of the water will then require new re-priming of the intake chamber upon resumption of filter operation upon opening the valve. Accordingly, with prior art valves it was preferably not to completely close down the valve and to only utilize the control valve for a reduction of the flow from a maximum to a reduced flow rate.

SUMMARY OF THE INVENTION

It is accordingly an object of the present invention to provide an intake unit having an improved control means for controlling the flow of aquarium water into an aquarium filter.

Another object of the present invention is to provide an aquarium filter intake unit having means to control the flow rate from a maximum down to complete shut-off or any amount inbetween.

Yet a further object of the present invention is to provide an intake unit for an aquarium filter having control means for adjusting the flow from the aquarium tank to the intake chamber of the filter, and for recirculating the water within the intake chamber without bringing in additional flow from the aquarium tank.

Still another object of the present invention is to provide an aquarium filter intake unit having means to control the flow rate, which is simple to operate, reduced in cost to manufacture, and effective in control of the flow rate.

Yet another object of the present invention is to provide an aquarium filter having a removable intake assembly unit which includes externally manipulatable control means for the control of the flow rate of aquarium water, to complete shut-off.

Briefly, in accordance with the present invention, there is provided an aquarium filter assembly including a housing unit for mounting onto a wall of an aquarium tank. An intake chamber in the filter receives contaminated water from the tank. A filtering chamber in fluid flow communication with the intake chamber receives the contaminated water, filters it, and discharges the filtered water back into the aquarium tank. An intake tube assembly includes an inlet end for positioning in the aquarium tank and an outlet end for positioning within the intake chamber. A motor driven impeller is coupled to the outlet end of the intake tube and operatively maintains a flow of contaminated water from the aquarium tank through the inlet end and out of the outlet end into the intake chamber. A control valve is coupled to the intake tube for controlling the flow rate from the aquarium from a maximum to complete shutoff or any value inbetween, while maintaining maximum flow through the outlet end of the intake assembly to maintain cooling of the stator unit.

In an embodiment of the invention, the intake tube assembly includes bypass ports positioned adjacent the outlet end and submerged within the intake chamber of the filter. The control valve includes a sleeve slidably positioned about the intake tube adjacent the outlet end and slidable, for selective exposure of the bypass ports to thereby regulate the flow rate of the aquarium water from the aquarium tank into the filter.

With the sleeve moved to a position completely covering the bypass ports, maximum flow rate occurs from the aquarium tank through the intake tube assembly and into the intake chamber. With the bypass ports completely exposed the water within the intake chamber recirculates by flowing into the bypass ports and by discharge of the impeller flows out of the outlet end back into the same intake chamber for local recirculation, while substantially no water flows into the inlet end from the aquarium tank.

The sleeve can be connected to a control arm which is positioned adjacent the tube and projects externally above the housing through a slit in the cover of the filter assembly. Suitable retention means can be provided to retain the sleeve in its maximum and minimum flow positions.

Because of the continued local recirculation within the intake chamber during shut off, the motor unit is maintained cool by the recirculating water.

The aforementioned objects, features and advantages of the invention will, in part, be pointed out with particularity and will, in part, become obvious from the following more detailed description of the invention, taken in conjunction with the accompanying drawings, which form an integral part thereof.

BRIEF DESCRIPTION OF THE DRAWINGS

In the drawings.

In the various figures of the drawing, like reference characters designate like parts.

DESCRIPTION OF THE PREFERRED EMBODIMENT

Figure 1:
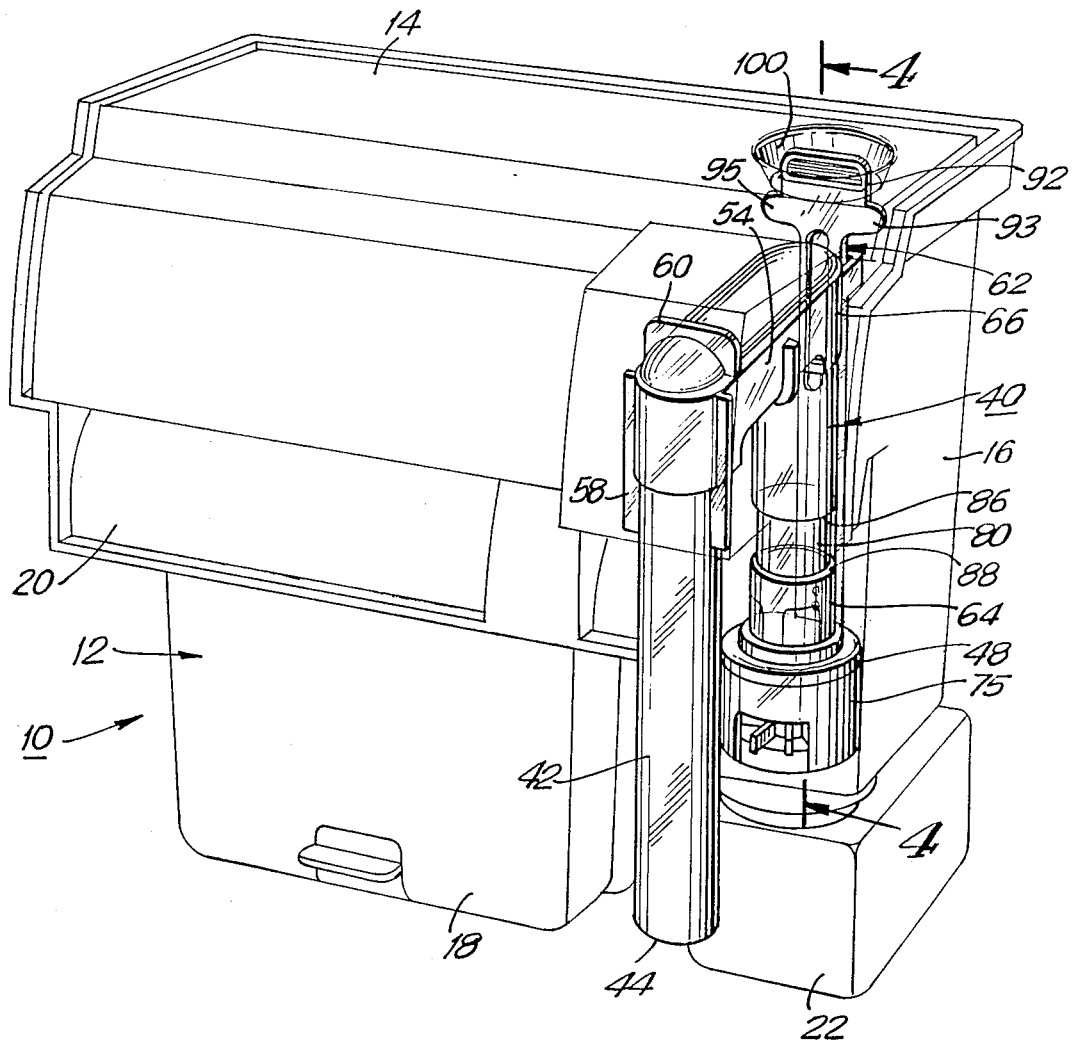
FIG. 1 is a perspective view of an aquarium filter assembly in accordance with the present invention.

Referring now to the drawings, and specifically to FIGS. 1-4, there is shown an aquarium filter, designated generally by the number 10, and comprising a housing 12 and a removable cover 14. The housing includes an intake chamber 16 in which contaminated water from the aquarium tank is initially collected and from which the water flows into a filtering chamber 18 which would include suitable filter material, typically in the form of a filter cartridge. The water flows across the filter cartridge and passes into a clean water compartment in which a spillway 20 extends. The water overflows the spillway and passes back into the aquarium tank in a filtered and aerated condition.

A removable motor stator unit 22 is coupled through an aperture 24 at the lower end of the intake chamber 16 to drive an impeller unit 26, having impeller blades 28. A neck portion 30 extends upwardly from the motor stator unit 22 including openings 34 through which the impeller blades 28 can operate. An O-ring 36 seals the interconnection between the motor stator unit 22 and the housing 12.

The impeller unit 26 is mounted onto a rotor which is magnetically coupled to and rotatably driven by the stator unit 22. For further details of the operation of the motor stator unit, the magnetically coupled rotor and the entire filter, reference is had to the aforementioned two U.S. Patents both of which are incorporated herein by reference.

Water from the aquarium is brought into the filter through a unitary intake tube assembly unit shown generally at 40. The intake assembly is a substantially U-shaped member including a vertical intake leg 42 having an inlet 44 which would be positioned into the water of an aquarium tank. It should be appreciated that the inlet 44 can be either directly inserted into the aquarium tank to be submerged beneath the level of the aquarium tank water or can be coupled to extensions and/or strainers and these submerged in the water.

The opposing outlet leg 46 has an outlet end 48 which includes a plurality of bypass ports 50 peripherally spaced about the end.

Interconnecting the inlet leg 42 and the outlet leg 46 is a substantially horizontal interconnecting leg 54 permitting fluid flow communication between the inlet and outlet legs. Appropriate retaining ribs 56 are positioned on the intake tube assembly which matingly engage cooperative receiving portions in the filter housing to securely retain the intake assembly in place. Upon clogging of the filter cartridge, water overflows the intake chamber wall and interconnecting leg 54. To avoid accidental spilling of water onto the aquarium cover abutting leg 42, a baffle 58 is provided at the front of the intake tube to prevent water from wrapping around the tube and flowing onto the cover of the aquarium tank. The protecting wall 60 is a diverter which prevents water from running down the front of the tube.

Figure 3:
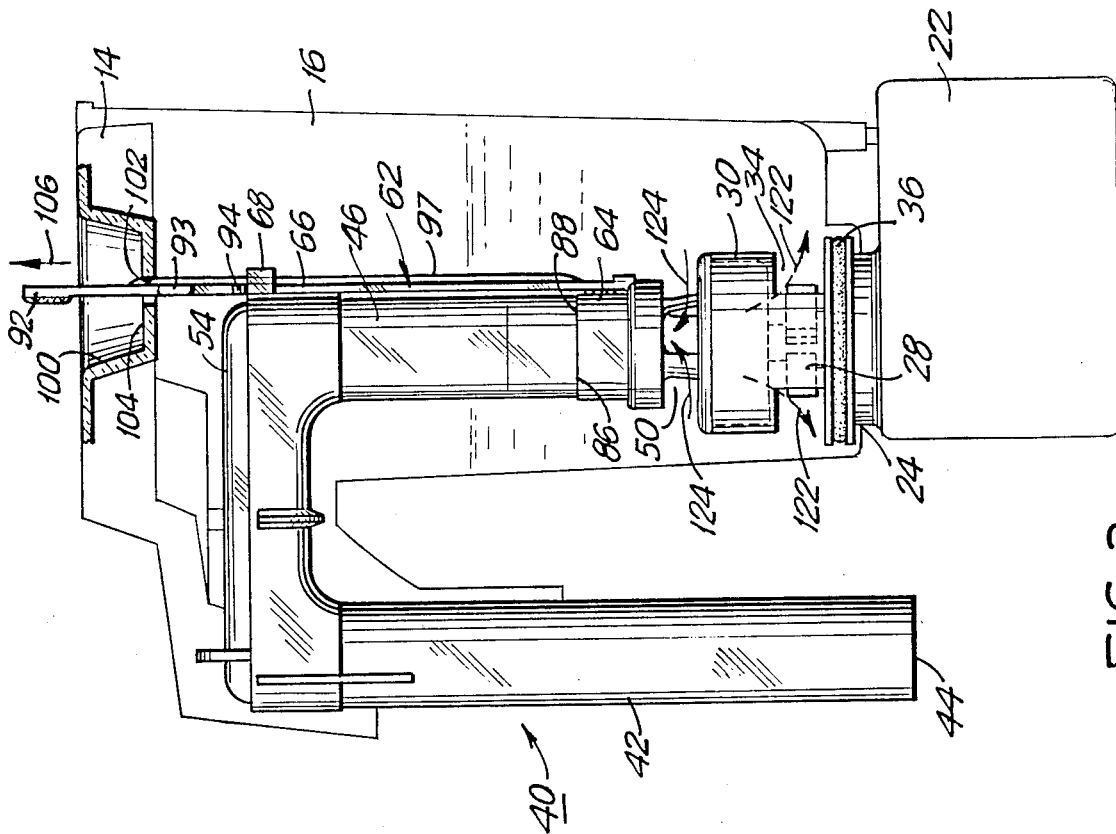
FIG. 3 is a view similar to that shown in FIG. 2 with the valve in its raised position, thereby exposing the bypass ports to substantially shut off the flow from the aquarium tank into the filter while providing local recirculation of water within the intake chamber of the filter.
Figure 2:
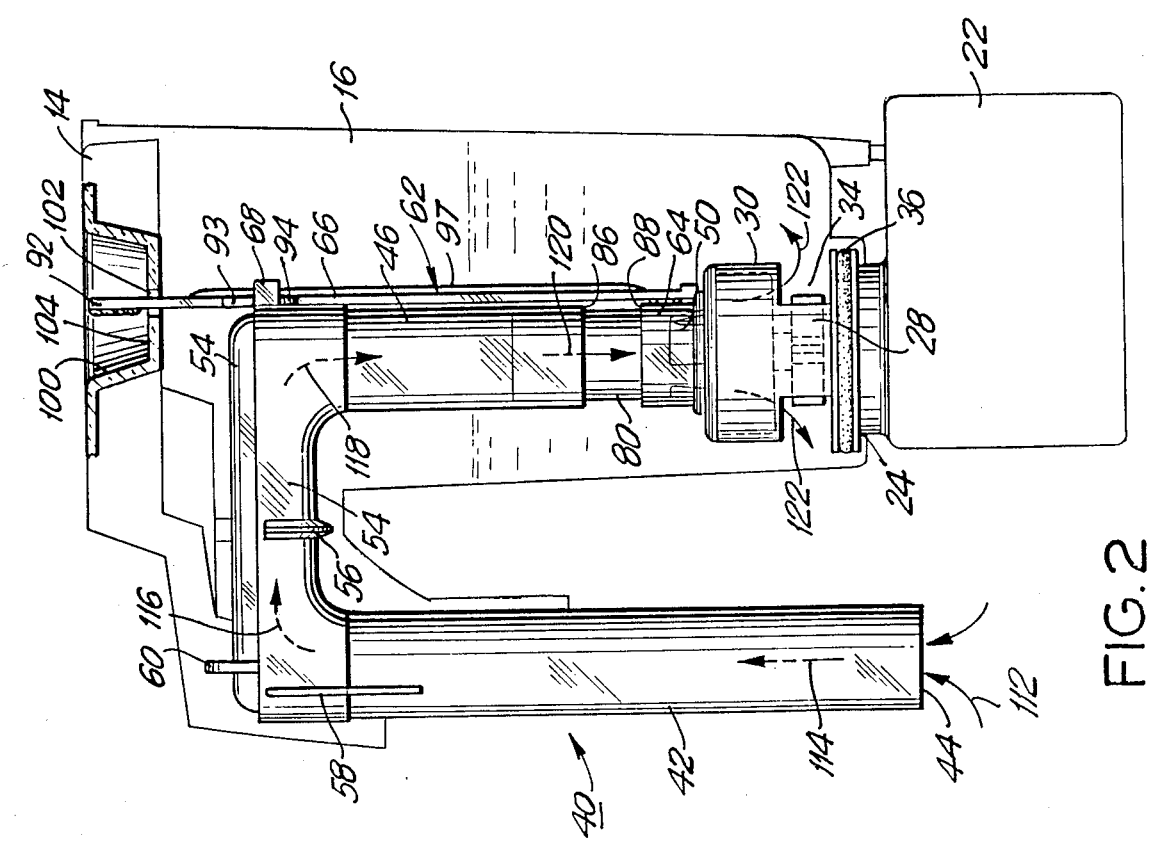
FIG. 2 is a side view of the aquarium filter assembly shown in FIG. 1 with the valve in its lowered position closing the bypass ports in the intake tube assembly, thereby providing maximum flow from the aquarium tank into the aquarium filter.

Control of the flow rate of aquarium water into the filter is achieved by means of a control device, shown generally at 62 and including a circular cylindrical sleeve 64 positioned around the outlet leg 46 with a substantially vertically extending control arm 66 extending adjacent and parallel to the outlet leg 46. The control arm 66 can be manipulated to a normal lowermost position, as shown in FIG. 2, wherein the sleeve 64 covers the bypass ports 50 at the outlet end 48 of the leg 46. In this position, as shown in FIG. 2, maximum flow will occur. The sleeve can be moved upwardly, as shown in FIG. 3, where the bypass ports 50 are exposed. In this position, the flow rate is reduced and can be shut off if desired. A recirculating flow will occur within the intake chamber 16, as will hereinafter be explained.

In order to retain the control arm 66 adjacent the outlet leg 46, a pair of opposing fingers, 68, 70 can project from an upper end of the outlet leg 46, adjacent the interconnecting leg 54. These opposing fingers define a guideway through which the control arm 66 can pass and is retained adjacent to the tube 46.

At the lower outlet end 48 of the outlet leg 46, a peripheral seat 72 is provided which can receive a downwardly projecting skirt portion 74 at the lower end of the sleeve 64. The seat will retain the sleeve secured in place when the sleeve is in its lowermost position covering the bypass ports 50. The outlet end can also include internal ribs 75 which support an inner rim 76 which securely receives the upper end of the impeller unit 26 in the form of a deformable rubber stud 78. The impeller unit will thus be removable from the lower end of the intake assembly 40.

Figure 4:
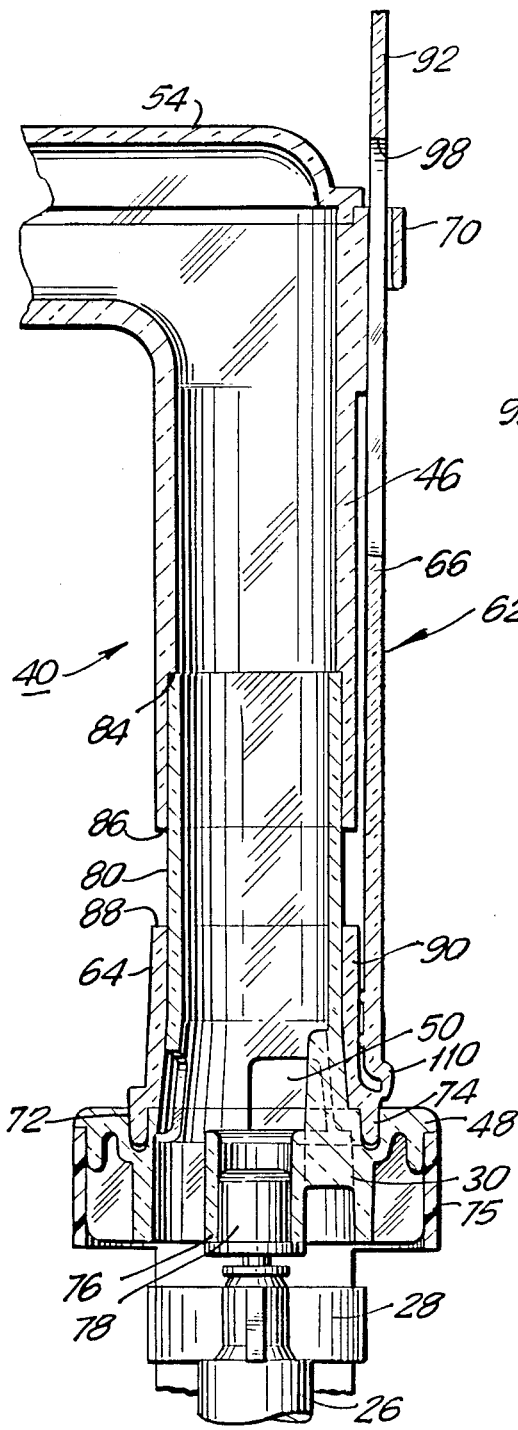
FIG. 4 is a sectional view taken along lines 4—4 of FIG. 1 and showing construction of the intake tube assembly with the control valve.

The outlet leg 46, as shown in FIG. 4, can be formed of a lower section 80 which is telescopically insertable within an upper section 82. An internal shoulder 84 is provided as a stop to the insertion of the lower section 80 of the legs. At the same time, the distal portion 86 at the edge of the upper section 82 which sits outside the lower leg section 80 serves as a shoulder stop for the upper end 88 of the sleeve 64. This will limit the upward movement of the sleeve.

At the same time, because of the separability of the lower section 80 from the upper section 82 of the outlet leg 46, the two parts can be disengaged to completely remove the sleeve 64 for cleaning and subsequent reassembling for reinsertion back to the filter assembly.

It should also be noted, that the end of the outlet leg 46 is outwardly flared to provide a tight fit of the sleeve as it is pushed into its downward position for maximum flow, and will thereby retain the sleeve secured in place during its normal operation where maximum flow is desired from the aquarium tank.

Figure 5:
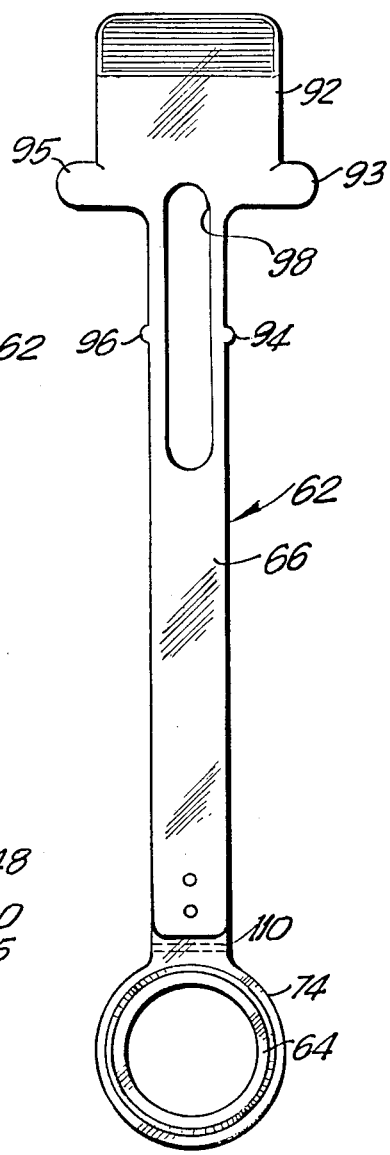
FIG. 5 is a top view of the control unit formed as an integral unit including the sleeve and control arm.

As best seen in FIG. 5, the control device 62 includes the control arm 66 and at its upper end can include an enlarged manipulating handle 92. A pair of outwardly projecting wings 93, 95 extend from the handle 92 and will abut the undersurface of the filter cover serving as a stop to upwardly lifting the control device too far above which might also displace the entire intake assembly. Optionally, there can also be included the outwardly projecting dimples 94, 96, laterally extending from either side of the manipulating control arm 66. An oval shaped slot 98 is also optionally interspaced between the dimples 94, 96. For additional rigidity, a rib 97 can be positioned along the length of the control arm 66.

As best noted in FIGS. 2 and 3, normally, the optional dimples 94, 96 are located below the projecting fingers 68, 70 defining the guideway on the outlet leg 46. When it is desired to move the control valve to its uppermost position, the handle 92 is pulled upwardly whereby the sleeve 64 can expose the bypass port 50. In so doing, and by providing a pulling force, the dimples 94, 96 are pulled through the guideway defined between the fingers 68, 70. To facilitate the inward bowing of the dimples 94, 96 which normally extend further outward than the guideway, the opening 98, permits flexibility of the dimples 94, 96 to close adjacent to each other, thereby permitting their passage through the guideway. The dimples will then sit on the top of the fingers 68, 70, retaining the sleeve in its uppermost position where the bypass ports 50 are exposed.

To put the control valve back to its downward position, it is just necessary to push downward on the handle and the dimples 94, 96 can move together permitting their passage downward through the guideway and permitting lowering of the control valve to its lowermost position.

Even without the dimples, the control arm can be made to have a bias against the guideway which will provide sufficient tension to permit moving the control arm into its desired position between open, shut off, and any position therebetween.

In order to permit external manipulation of the control device 62, a recess 100 is provided in the cover with an aperture 102 in the bottom wall 104 of the recess. The handle 92 at the upper end of the control arm 66 passes through the aperture 102 and normally sits within the recess 100. In this way, in the normal flow position, the top of the handle is flush with the upper end of the cover. By placing the fingers on the handle 92 in the recess 100 and pulling upwardly, as shown by the arrow 106 in FIG. 3, the control arm 66 is pulled to its upper position, exposing the bypass ports, as shown in FIG. 3. The wings 93, 95 prevent pulling up on the control arm 66 too much. It has been found that in actual use, when the handle is grasped with the fingers, the user will hold down onto the cover with his other fingers which will serve to keep the cover in place and prevent it from being removed.

Figure 6:
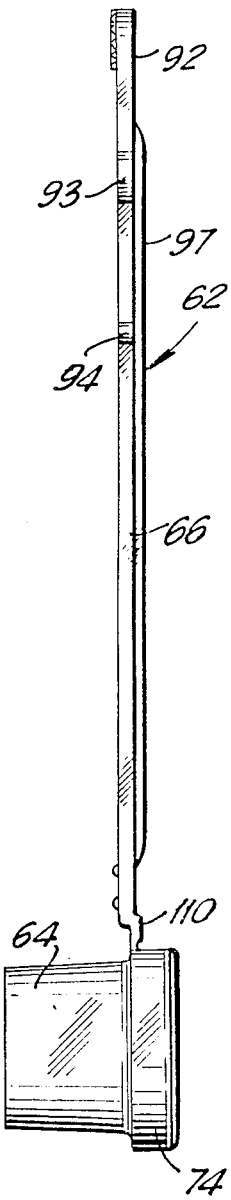
FIG. 6 is a side view of a modified control unit.

Referring now to FIG. 5 and FIG. 6, the manufacture of the control valve can be made as a single integral unit. Initially, when manufactured, the axis of the elongated control arm 66 is perpendicular to the axis of the cylindrical sleeve member 64. The two parts are interconnected by a living hinge 110 therebetween. When placed into operation, the control arm 66 is bent perpendicular to the sleeve, so that the axis of the control arm and the axis of the cylindrical sleeve are parallel to each other, as can best be seen in FIG. 4.

When so doing, the integral living hinge 110 provides a pressure which would normally tend to force the control arm and sleeve apart from each other. With the control arm being retained in place by means of the guideway formed by the fingers 68, 70, the control arm is secured in place and pressure is applied outwardly from the hinge on the arm and against the guideway fingers. At the same time, the sleeve is pressed inwardly so that it hugs the outer leg 46.

In normal operation, as shown in FIG. 2, the control valve is in its lowermost position covering the bypass ports 50. The intake chamber 16 is initially primed so that the impeller blades 28 are covered with water. The impeller blades are operated by energizing the motor unit 22. In so doing, a reduced pressure is formed at the outlet end 48 of the outlet leg 46. In so doing, a suction is formed which pulls in the water from the aquarium tank, into the inlet end 44, as shown by the arrows 112. The water flows upwardly along the arrows shown at 114, 116, 118 and 120 and is finally discharged into the intake chamber 16 as shown by the arrows 122.

When it is desired to reduce the flow from the aquarium tank, as for example when feeding the fish, the handle 92 is pulled upwardly as shown by the arrow 106 in FIG. 3. In doing so, the bypass ports 50 are exposed. In so exposing the bypass ports, the water in the intake chamber will be sucked in along the arrows 124 through the bypass ports. This water will again be discharged along the arrows 122 by means of the impeller. However, because the length of the flow path of the water flowing into the bypass ports is less than the flow path of the water flowing in through the inlet 44, the water from the aquarium tank will be substantially shut off and no flow will come into the intake assembly 40.

Because of the continuous recirculation of the water within the intake chamber 16, there will be a continuous recirculating flow within the intake chamber itself which will tend to cool the motor unit 22. This will prevent overheating of the motor unit where otherwise it might evaporate the water within the intake chamber causing it to run dry and thereby requiring repriming in order to start up the aquarium filter.

Accordingly, through a simple control valve, the flow into the aquarium filter can be controlled between maximum and shut off, and any value therebetween. It should be appreciated, that if desired, suitable settings can be placed along the outlet leg as well as on the control arm to provide intermediate stops and positioning, to thereby have any desired flow rate as desired from maximum to shutoff.

There has been described heretofore the best embodiments of the invention presently contemplated. However, it is to be understood that various changes and modifications may be made thereto without departing from the spirit of the invention.

We claim:

1. An intake unit for an aquarium filter comprising: a substantially inverted U-shaped tube having an inlet end for insertion into an aquarium tank and an outlet end for insertion into an intake chamber of an aquarium filter, an impeller unit operatively coupled to the outlet end for discharge of water from the tube into the intake chamber, at least one bypass port positioned along the tube proximate the outlet end, and control means operatively associated with the tube for selective exposure of the bypass port to thereby regulate the flow rate of aquarium water from the tank into the filter, and wherein said control means comprises a sleeve positioned around said tube and movable between a maximum flow position covering the port and a minimum flow position exposing the port.

2. An intake unit as in claim 1, wherein said port is along a portion of the tube submerged within the intake chamber, whereby in the minimum flow position water is recirculated within the intake chamber passing into the tube through the bypass port and out of the tube through the outlet end.

3. An intake unit as in claim 1, and comprising a control arm coupled to said sleeve and projecting from the filter for control of the flow rate externally of the filter.

4. An intake unit as in claim 3, wherein said control arm ends along at least a portion of said tube, and further comprising guide means along said tube for slidably guiding said control arm therethrough.

5. An intake unit as in claim 4, wherein said guide means comprise a pair of opposing fingers projecting from the tube and extending toward each other to define a guideway.

6. An intake unit as in claim 4, and comprising retention means for locking said control arm in the maximum and minimum flow positions.

7. An intake unit as in claim 6, wherein said maximum flow position is a lowered positioning of said sleeve, and the minimum flow position is a raised positioning of said sleeve, and comprising a pair of dimples laterally projecting from said control arm and passing through said guide means upon application of force, and wherein in said raised position said dimples are seated above said guide means.

8. An intake unit as in claim 7, and comprising an aperture in said control arm interposed between said dimples to facilitate constriction of said control arm to permit passage of the dimples through the guide means, said dimples normally extending beyond the guide means.

9. An intake unit as in claim 4, wherein said control arm and sleeve are integrally formed, and comprising a living hinge therebetween, whereby with the sleeve positioned on the tube, and the control arm retained against the tube, the sleeve is pressed against the tube and the control arm is pressed against the guide means.

10. An intake unit as in claim 9, wherein said control arm is elongated and having an axis, and said sleeve is cylindrical and having an axis, and wherein said control arm and sleeve are formed such that the axis of the sleeve is perpendicular to the axis of the control arm, and in operation the axes are parallel to each other.

11. An intake unit as in claim 1, and comprising a seat formed in the outlet end of the tube, and a mating lip on said sleeve for fitting into said seat to retain said sleeve secured in the maximum flow position.

12. An intake unit as in claim 11, wherein said bypass port is positioned adjacent said seat.

13. An intake unit as in claim 1, wherein said tube comprises an inlet leg terminating in said inlet end, an outlet leg terminating in said outlet end, the outlet leg comprising upper and lower leg sections, the lower leg section telescoping into the upper leg section, said sleeve slidable along said lower leg section, and wherein a distal end of the upper leg section overlying the lower leg sections forms a shoulder stop to the upward sliding of the sleeve.

14. An intake unit as in claim 3, and comprising a pair of laterally projecting wings for preventing excessive extraction of control means from the filter.

15. An intake unit as in claim 3, and comprising rib means extending along the control arm for increased rigidity.

16. An intake unit as in claim 1, and comprising means at said outlet end for removably coupling the impeller unit to the tube.

17. An aquarium filter assembly comprising: a housing unit for mounting on a wall of an aquarium tank, an intake chamber for receiving contaminated water from the aquarium tank, a filtering chamber for filtering the contaminated water received in the intake chamber and discharging the filtered water back into the aquarium, an intake tube having an inlet end for positioning in the aquarium tank, and an outlet end for positioning in the intake chamber, impeller means coupled to the outlet end of the intake tube for operatively maintaining a flow of contaminated water from the aquarium tank to the inlet end, out of the outlet end and into the intake chamber, and a control valve coupled to the intake tube for controlling said flow from a maximum flow rate to substantially shutoff, and any value therebetween, and comprising a bypass port in said intake tube adjacent said outlet end, said control valve comprising a sleeve movable about said tube to cover said bypass port for a maximum flow rate, and to expose said bypass port for substantial shut-off.

18. An aquarium filter as in claim 17, wherein said bypass port remain submerged in the intake chamber, whereby during shut-off, the water in the intake chamber is recirculated by the impeller means to flow into the bypass port and out of the outlet end back into the intake chamber.

19. An aquarium filter as in claim 18, and wherein said sleeve comprises an operating control arm extendable through said housing for control of the flow externally of the filter.

20. An aquarium filter as in claim 19, wherein said filter further comprises a cover, a slot formed in said cover, and wherein a distal end of said control arm projects through said slot and is movable between a raised and a lowered position to respectively shut off and maximize the flow rate.

* * * * *